3,140,167
2,6-DI-t-BUTYL-4-SUBSTITUTED PHENYL N-METHYL CARBAMATE AND USE THEREOF AS SELECTIVE HERBICIDES
Albert H. Haubein, Newark, Del., assignor to Hercules Powder Company, Wilmington, Del., a corporation of Delaware
No Drawing. Filed June 7, 1962, Ser. No. 200,651
9 Claims. (Cl. 71—2.6)

This invention relates to certain novel compounds, which may be broadly described as being substituted-phenyl N-methylcarbamates, and to herbicidal compositions containing these new compounds. More specifically, the invention relates to herbicidal compositions which are selective for the pre-emergence control of crabgrass.

Many substances, both inorganic and organic, have been proposed and used as herbicides, but the problem of controlling undesirable plant growth still remains. Selectively controlling undesirable plant growth is important not only in farming but also in gardening and in the establishment of fine lawns. Particularly in the latter, it is desirable to control the many varieties of gras-type weeds. Although a large number of herbicides have heretofore been used and have exhibited varying degrees of success in different applications, the problem of selectively controlling grass-type weeds has been a troublesome problem.

The art has long known of herbicidally active materials such as 2,4-dichlorophenoxyacetic acid, 2,4,5-trichlorophenoxyacetic acid, their salts and esters, and compounds such as pentachlorophenol and 2,2-dichloropropionic acid. These materials have, in many instances, been satisfactory in specific applications, but, in other instances, they have been insufficiently selective, and this has resulted in the killing of both desirable and undesirable plant growth. In so far as undesirable grass-type weeds are concerned, a material has recently been developed which is an effective pre-emergence herbicide for crabgrass. This material is dimethyl-2,3,5,6-tetrachloroterephthalate.

Now, in accordance with the present invention, certain substituted-phenyl N-methylcarbamates have been discovered which also are selective in that they are pre-emergence herbicides for crabgrass. These carbamates are 2,6-di-t-butyl-4-methylphenyl N-methylcarbamate, 2,6-di-t-butyl-4-methoxyphenyl N-methylcarbamate and 2,6-di-t-butyl-4-chlorophenyl N-methylcarbamate. These compounds have the structural formula

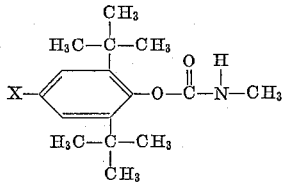

where X is selected from the group consisting of $CH_3-$, $CH_3O-$ and $Cl-$. These compounds are tolerated to a high degree by desirable plants and established turf grasses such as Kentucky Bluegrass, Penncross bent grass, and chewings fescue. On the other hand, these compounds will give complete kill of seedlings of crabgrass and yellow foxtail. It also is true that these compounds are detrimental to seedlings of desirable turf grasses, but by proper selection of time of application, as is also necessary in the case of dimethyl-2,3,5,6-tetrachloroterephthalate, it is possible to obviate damage to such seedlings.

The significant feature of the present invention is the ability of the new carbamates to act as pre-emergence herbicides against crabgrass without harming other desirable vegetation. The compounds are readily prepared by reaction of the corresponding phenols with methylisocyanate. For example, the reaction of 2,6-di-t-butyl-4-methylphenol with methylisocyanate leads to 2,6-di-t-butyl-4-methylphenyl N-methylcarbamate. Preparation of the compounds and of herbicidal compositions containing them and evaluation of the herbicidal compositions are more fully set forth in the following examples in which all parts and percentages are by weight unless otherwise specified.

EXAMPLE 1

To 965 parts of 2,6-di-t-butyl-4-methylphenol dissolved in 2,160 parts of toluene was added 182 parts of triethylamine, and there then was added 290 parts of methylisocyanate dropwise over a period of one hour. The reaction mixture was permitted to stand overnight at room temperature, and it was subsequently heated for eight hours at 50° C. The reaction mixture then was cooled, and the crystals which formed were removed by filtration. There was obtained 770 parts of 2,6-di-t-butyl-4-methylphenyl N-methylcarbamate in the form of white crystals having a melting point of 203–204° C. The compound analyzed for 5.00% nitrogen, the theoretical amount being 5.10%. Addition of petroleum ether to the filtrate produced an additional 98 parts of crystals having a melting point of 203–204° C.

EXAMPLE 2

To 1500 parts of 2,6-di-t-butyl-4-methoxyphenol dissolved in 3,000 parts of toluene was added 73 parts of triethylamine. To the resulting solution there was added a solution of 550 parts of methylisocyanate in 462 parts of toluene. The resulting reaction mixture was stirred for four hours at room temperature and subsequently for an additional four hours at 50° C. The reaction mixture then was cooled and 1400 parts of 2,6-di-t-butyl-4-methoxyphenyl N-methylcarbamate was recovered by filtration in the form of white crystals having a melting point of 174–179° C. Analysis showed that the compound contained 4.73% nitrogen, the theoretical amount of nitrogen being 4.82%.

EXAMPLE 3

Two hundred and forty parts of 2,6-di-t-butyl-4-chlorophenol was dissolved in 300 parts of toluene, and to the resulting solution there was added 7.3 parts of triethylamine. There was then added a solution of 75 parts of methylisocyanate in 62.7 parts of toluene. The resulting reaction mixture was stirred for four hours at room temperature and subsequently for an additional four hours at 50° C. The reaction mixture then was cooled, and the crystals which formed were removed by filtration. There was obtained 243 parts of 2,6-di-t-butyl-4-chlorophenyl N-methylcarbamate in the form of white crystals having a melting point of 212–213° C. The compound analyzed for 11.7% chlorine and 4.63% nitrogen. The corresponding theoretical values are 11.6% and 4.64%, respectively.

EXAMPLE 4

The compounds of this invention were subjected to a screening test for evaluating pre-emergence herbicidal activity. To do this there was prepared an aqueous suspension containing 15 grams active compound per liter and spraying at the rate of 80 gallons per acre for a ten-pound-per-acre test on soil containing seeds which had been planted 24 hours earlier. A double spraying was used for a twenty-pound-per-acre test. The aqueous suspension was made by dissolving the particular compound to be tested in acetone to a concentration of 15 grams per 200 ml. acetone solution, adding "Tween 20" (a sorbitol monolaurate polyoxyethylene derivative) to a concentration of 10 grams per 200 ml. of the acetone solution, and diluting the acetone solution with water to bring the concentration to 15 grams active compound per liter. For a two-pound-per-acre test, 100 ml. of the original formulation was taken and diluted to 1,000 ml. with a mixture composed of 20% acetone, 1% "Tween 20," and 79% water, and the resulting formulation then was sprayed twice at the rate of 80 gallons per acre.

The seeds used in the screening tests were: millet (Setaria sp.); corn (Zea mays); curled mustard (Brassica juncea); and cotton (Gossypium hirsutum). After treatment the seeds were allowed to germinate and grow for a period of three weeks, and during this time the minimum temperatures were approximately 70° F. During the three-weeks period the seeds and seedlings were watered, the first two waterings being done by sprinkling in order to leach the chemical into the soil. Thereafter, water was applied by subirrigation. Data were taken three weeks after treatment. The numerical values given in the following table are based on a 0–10 rating scale in which 0 means no damage to the plants and 10 indicates complete kill of the plants.

Table 1

| Compound | Rate, lb./acre | Species | | | |
|---|---|---|---|---|---|
| | | Millet | Corn | Mustard | Cotton |
| 2,6-Di-t-butyl-4-methylphenyl N-methylcarbamate | 2 | 4 | 0 | 1 | 0 |
| | 10 | 8 | 2 | 6 | 0 |
| 2,6-Di-t-butyl-4-methoxyphenyl N-methylcarbamate | 2 | 0 | 0 | 0 | 0 |
| | 20 | 8 | 3 | 5 | 2 |
| 2,6-Di-t-butyl-4-chlorophenyl N-methylcarbamate | 2 | 0 | 0 | 0 | 0 |
| | 20 | 0 | 0 | 0 | 0 |

EXAMPLE 5

The procedure followed in Example 4 was repeated for 2,6-di-t-butyl-4-methylphenyl N-methylcarbamate in a secondary test for evaluation of herbicidal activity using a total of nineteen different plant species. The procedure of Example 4 also was varied to the extent of using rates of application which were 2, 4, and 8 pounds per acre, respectively. The formulation for the four-pounds-per-acre application was prepared by taking 200 ml. of the original formulation, diluting this to 1,000 ml. with a mixture composed of 20% acetone, 1% "Tween 20," and 79% water, and spraying twice with the resulting formulation. The formulation used in the eight-pounds-per-acre application was prepared by taking 400 ml. of the original formulation and diluting it to 1,000 ml. with the 20% acetone, 1% "Tween 20," and 79% water mixture, and spraying twice with the resulting formulation. After treatment the seeds were allowed to germinate and grow for three weeks. Ratings on the effect of the chemicals were made three weeks after treatment, as in Example 4. The seeds used in this test were as follows:

Crabgrass (Digitaria sp.)
Yellow foxtail (Setaria lutescens)
Millet (Setaria sp.)
Wild oats (Avena fatua)
Cotton (Gossypium hirsutum)
Peas (Pisum sativum)
Buckwheat (Fagopyrum esculentum)
Sunflower (Helianthus annuus)
Cucumber (Cucumis sativus)
Soybean (Soja max)
Alfalfa (Medicago sativa)
Onion (Allium cepa)
Curled mustard (Brassica juncea)
Wild mustard (Brassica arvensis)
Flax (Linum usitatissimum)
Pigweed (Amaranthus retroflexus)
Kidneybean (Phaseolus vulgaris)
Tomato (Lycopersicum esculentum)
Carrot (Dacus carota)

The following table summarizes the test data obtained:

Table 2

| Species | Application Rates | | |
|---|---|---|---|
| | 2 lb./Acre | 4 lb./Acre | 8 lb./Acre |
| Crabgrass | 9 | 10 | 10 |
| Yellow Foxtail | 7 | 8 | 10 |
| Millet | 4 | 5 | 6 |
| Wild Oats | 0 | 0 | 1 |
| Cotton | 0 | 0 | 1 |
| Peas | 0 | 0 | 0 |
| Buckwheat | 0 | 0 | 1 |
| Sunflower | 0 | 0 | 2 |
| Cucumber | 0 | 0 | 0 |
| Soybean | 0 | 0 | 0 |
| Alfalfa | 0 | 1 | 2 |
| Onion | 0 | 1 | 1 |
| Curled Mustard | 3 | 6 | 7 |
| Wild Mustard | 2 | 3 | 4 |
| Flax | 0 | 0 | 0 |
| Pigweed | 0 | 0 | 0 |
| Kidneybean | 0 | 0 | 0 |
| Tomato | 3 | 4 | 5 |
| Carrot | 0 | 1 | 2 |

EXAMPLE 6

A further pre-emergence test for the compounds of this invention was carried out against cragrass and wild oats, and there was included in this test a comparison with dimethyl-2,3,5,6-tetrachloroterephthalate. The results are given in the following table.

Table 3

| Compound | Rate, lb./acre | Species | |
|---|---|---|---|
| | | Crabgrass | Wild Oats |
| 2,6-Di-t-butyl-4-methylphenyl N-methylcarbamate | 2 | 7 | 0 |
| | 10 | 10 | 0 |
| 2,6-Di-t-butyl-4-methoxyphenyl N-methylcarbamate | 2 | 7 | 0 |
| | 10 | 10 | 0 |
| 2,6-Di-t-butyl-4-chlorophenyl N-methylcarbamate | 2 | 9 | 0 |
| | 10 | 10 | 2 |
| Dimethyl-2,3,5,6-tetrachloroterephthalate | 2 | 8 | 0 |
| | 10 | 10 | 2 |

EXAMPLE 7

To evaluate the persistence of the herbicidal activity of 2,6-di-t-butyl-4-methylphenyl N-methylcarbamate, plots of soil were treated by the procedure of Example 4 to provide amounts of the carbamate corresponding to rates of application of five pounds per acre and ten pounds per acre. Immediately after treatment, the soil was surface watered. Thereafter, water was periodically applied by subirrigation. By replanting these soil plots at intervals with crabgrass seed, it was determined that toxicity persisted for more than five months.

The compounds of this invention are used in compositions for use as herbicides in liquid or solid form. The compounds may be used singly or in admixture. Solutions of the compounds, for example, may be used as liquids in solvents such as cyclohexanol, furfural, isobutyl alcohol, cyclohexanone, isopropyl acetate, and acetone and applied directly to the terrain in which annual weedy grasses normally grow. The compounds in solid form or solutions thereof in any of the above-mentioned solvents may be admixed with water using a suitable emulsifying agent to form an aqueous emulsion or suspension which is used as the carrier of the herbicide composition. The solid compound or liquid compound with solvent may also be extended by admixing with a solid carrier to form granules or dusts which are used as the herbicidal compositions. The dusts may be further extended by mixing with water and a surfactant. Granules and dusts may be made from any properly sized solids, preferably those that are readily available and low in price, such as talc, attapulgite, natural clays, pyrophyllite, diatomaceous earth, kaolin, aluminum and magnesium silicates, montmorillonite, and similar substances such as are used as carriers in the insecticide art.

Dusts are commonly produced from a dust former such as talc by blending the active ingredient with talc and further grinding the mixture of active compound and talc with more talc so as to obtain a fluid dust of particle size less than about 50 microns. Fuller's earth is often substituted, and the active ingredient is often applied by spraying an organic solvent solution of the active compound of concentration in the range of 10 to 50%, evaporating the solvent and using the fuller's earth mixture as a concentrate for further blending at the time of actual use. Similarly, the clays are often used for the same purpose and the concentrates are often used for producing suspensions in water which are readily sprayed over the area to be treated, in which case carboxymethylcellulose, methyl cellulose and other carbohydrate gums may be used to aid in maintaining the suspensions.

One of the preferred types of herbicidal compositions is that in which water is used as the major component and a compound of this invention is a minor component. The only drawback to this type of composition when used as a pre-emergence herbicide for annual weedy grasses is that it is not as easily and conveniently applied as is a granular formulation. Nevertheless, such aqueous dispersions may be prepared at the time of actual use so as to have a content of 0.5 to 10% of the active compound by dispersing a concentrate made up from about 10 to about 90% active compound, about 0.5 to 10% dispersing agent, and 0 to 90% inert diluent. Dispersing agents which are useful in such concentrates are the well-known surface active agents of the anionic, cationic or nonionic type and include alkali metal (sodium or potassium) oleates and similar soaps, amine salts of long chain fatty acids (oleates), sulfonated animal and vegetable oils (fish oils and castor oil), sulfonated petroleum oils, sulfonated acyclic hydrocarbons, sodium salts of lignin sulfonic acids, alkylnaphthalene sodium sulfonates, sodium lauryl sulfonate, disodium monolaurylphosphates, sorbitol laurate, pentaerythritol monostearate, glycerol monostearate, polyethylene oxides, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethyl ammonium bromide, and cetyl dimethylbenzylammonium chloride. The aqueous dispersions may thus be made from the compounds themselves, from the compounds dissolved in water-soluble or water-insoluble solvent or from wettable dusts.

From the standpoint of ease of application and convenience in handling, the preferred type of herbicidal composition for use in accordance with this invention is that which is in the form of granules. Clay granules, for example, may be used as the carrier material and a solvent solution or aqueous dispersion of the active ingredient may be sprayed on the granules to provide a coating of the active ingredient. It also is possible to coat the granules with a dust formulation and then spray with a sticking agent to insure retention of the coating during handling and application.

The active ingredients of the compositions are applied in an amount sufficient to exert the desired herbicidal action. For the selective control of crabgrass in accordance with this invention, the rate of application will be from about 2 to about 20 pounds per acre of the active compounds of this invention. The preferred amounts are in the range from about 5 to about 15 pounds per acre.

What I claim and desire to protect by Letters Patent is:

1. As a herbicidally active composition of matter, a compound selected from the group consisting of 2,6-di-t-butyl-4-methylphenyl N-methylcarbamate, 2,6-di-t-butyl-4-methoxyphenyl N-methylcarbamate and 2,6-di-t-butyl-4-chlorophenyl N-methylcarbamate.

2. As a herbicidally active composition of matter, 2,6-di-t-butyl-4-methylphenyl N-methylcarbamate.

3. As a herbicidally active composition of matter, 2,6-di-t-butyl-4-methoxyphenyl N-methylcarbamate.

4. As a herbicidally active composition of matter, 2,6-di-t-butyl-4-chlorophenyl N-methylcarbamate.

5. As a herbicidal composition, a compound of claim 1 in admixture with a major amount of a herbicidal carrier.

6. As a herbicidal composition, a compound of claim 1 in admixture with a major amount of an inert, dispersible solid.

7. As a herbicidal composition, a compound of claim 1 in admixture with a major amount of an inert, dispersible, volatile liquid.

8. The method of controlling annual weedy grasses which comprises contacting the soil in which said grasses grow, prior to emergence of said grasses, with a herbicidal amount of a compound selected from the group consisting of 2,6-di-t-butyl-4-methylphenyl N-methylcarbamate, 2,6-di-t-butyl-4-methoxyphenyl N-methylcarbamate and 2,6-di-t-butyl-4-chlorophenyl N-methylcarbamate.

9. The method of claim 8 in which the annual weedy grass is crabgrass.

References Cited in the file of this patent

UNITED STATES PATENTS

| | | |
|---|---|---|
| 2,776,197 | Gysin et al. | Jan. 1, 1957 |
| 2,933,383 | Lambrech | Apr. 19, 1960 |
| 3,027,397 | Steinberg et al. | Mar. 27, 1962 |